United States Patent Office 3,575,940
Patented Apr. 20, 1971

3,575,940
FLUOROCARBON COMPOUNDS AND POLYMERS THEREOF
Atsuo Katsushima, Fuse-shi, Iwao Hisamoto, Suita-shi, and Shoshin Fukui, Takahisa Kato, and Masayuki Nagai, Osaka-fu, Japan, assignors to Daikin Kogyo Kabushiki Kaisha, Kita-ku, Osaka-shi, Japan
No Drawing. Continuation-in-part of application Ser. No. 515,450, Dec. 21, 1965. This application Jan. 4, 1968, Ser. No. 695,549
Claims priority, application Japan, Dec. 30, 1964, 40/63, 40/65, 40/66; Nov. 1, 1965, 40/67,123
Int. Cl. C08f 3/62, 15/00
U.S. Cl. 260—78.4   7 Claims

ABSTRACT OF THE DISCLOSURE

Fluorocarbon compounds having the formula:

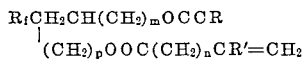

wherein $R_f$ is a perfluoroalkyl group having 3 to 21 carbon atoms, R is an alkyl group having 1 to 18 carbon atoms, R' is one member of the group consisting of hydrogen and methyl group, $m$ is an integer of from 0 to 10, $p$ is an integer of from 0 to 10 when $m$ is 0 and $p$ is 0 when $m$ is 1 to 10, and $n$ is an integer of from 0 to 10, and polymers derived therefrom.

---

This invention relates to a new and useful class of fluorocarbon compounds and their polymers; and to aqueous emulsions or organic solvent solutions thereof suitable for treating solid materials, such as fibrous or porous materials to render them water- and oil-repellent.

This application is a continuation-in-part of application of our co-pending application Ser. No. 515,450, filed on Dec. 21, 1965 now abandoned.

The new compounds are esters having the general formula:

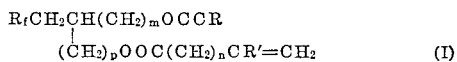   (I)

wherein $R_f$ is a straight-chain or branched-chain perfluoroalkyl group having 3 to 21 carbon atoms, R is an alkyl group having 1 to 18 carbon atoms, R' is hydrogen atom or methyl group, $m$ is an integer of from 0 to 10, $p$ is an integer of from 0 to 10 when $m$ is 0 and $p$ is integer, 0 when $m$ is 1 to 10, and $n$ is an integer of from 0 to 10.

In more detail, the esters of the invention include the compounds represented by the following formulas:

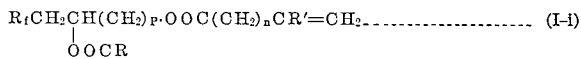   (I–i)

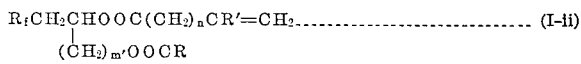   (I–ii)

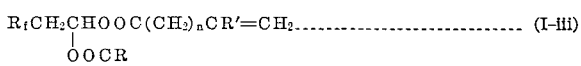   (I–iii)

wherein $R_f$, R, R' and $n$ are as defined before, $m'$ is an integer of from 1 to 10, and $p'$ is an integer from 1 to 10.

The esters of the invention can be readily polymerized to produce solid polymers which are of hydrophobic and oleophobic property and available as water-repellent and oil-repellent agents.

Said esters of the invention can be prepared by various methods. For instance, the esters of said Formulas I–i and I–ii are prepared by the methods as shown in the following Equations 1 to 4, in which a fluorinated haloalcohol is employed as a starting material:

(1) 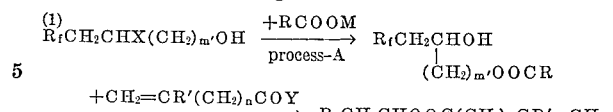

(2) 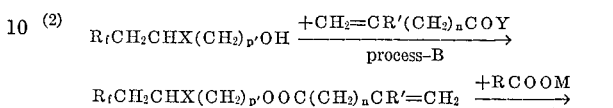

(3) 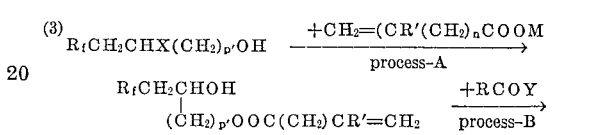

(4) 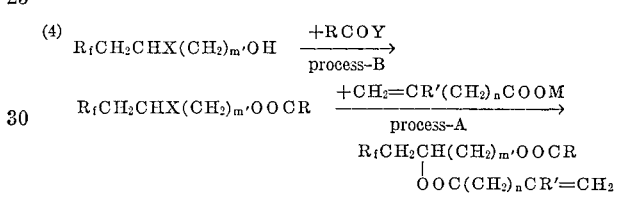

The esters of aforesaid Formulas I–ii and I–iii may be prepared by the methods as shown in the following Equations 5 and 6, in which a perfluoroalkyl halide ($R_fX$) or perfluoroalkyl sulfonyl halide ($R_fSO_2X$) is employed as a starting material:

(5) 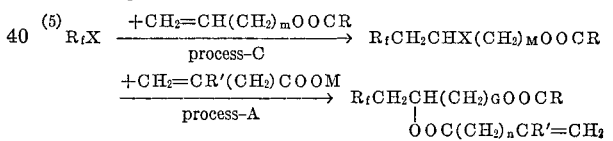

(6) 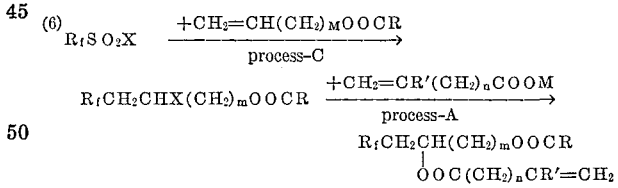

In said Equations 1 to 6, $R_f$, R, R', $m$, $m'$, $p'$ and $n$ are as defined before, and X is a halogen other than fluorine, preferably bromine or iodine, M is alkali metal or silver and Y is a halogen, —OH or —OR", R" being an alkyl group having from 1 to 5 carbon atoms.

In said reactions, the "process-A" indicated in each Equations 1 to 6 is carried out in organic liquid which is inert to the reactants and products. The usual organic liquids are, for example, saturated or unsaturated aliphatic monohydric alcohols having 3 to 10 carbon atoms such as isoamylalcohol, amylalcohol, butylalcohol, tertiary butylalcohol, secondary butylalcohol, heptylalcohol, hexylalcohol, octylalcohol, nonylalcohol, allylalcohol, crotylalcohol, etc.; fluorinated aliphatic alcohols such as

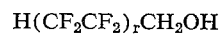

$r$ being an integer from 1 to 4, etc.; and ethers such as dioxane, tetrahydrofuran, anisole, polyoxypropylene, polyoxyethylene, etc. The reaction temperature at which the process is carried out is not critical and will usually be between about 100° and 200° C., although 110° to 150° C. is preferred. The reaction pressure also is not critical and varies over a wide range, but usually an autogeneous pressure is applied, and if organic solvents of sufficiently high boiling point are employed, the process may be carried out in an open vessel under an atmospheric pressure. The amount of alkali metal salts of or silver salts of aliphatic acids added to the reaction system varies over a wide range, but it is preferred a theoretical or excess amount of said compounds is employed. The reaction is usually completed with agitation in about 0.5 to 30 hours.

The "process-B" in aforesaid reaction Equations 1 to 4 is carried out by employing as an esterifying agent saturated or unsaturated aliphtic acids, or halides or esters thereof having the formula of RCOY or $$CH_2=CR'(CH_2)_nCOY$$

(wherein R, R', Y and $n$ are as defined before). The reaction temperature is not critical, but a temperature of about 50° to 150° C. is preferred. To accelerate the reaction, a dehydrating agent such as concentrated sulfuric acid, dried hydrogen chloride gas, etc., may be added to the reaction system if aliphatic acid is employed as an esterifying agent, and a hydrogenhalide acceptor such as zinc halide, concentrated sulfuric acid, pyridine, quinoline, etc., may be added if acid halide is used.

The "process-C" in aforesaid reaction Equations 5 and 6, which is addition reaction of a perfluoroalkyl halide ($R_fX$) or perfluoroalkylsulfonyl halide ($R_fSO_2X$) to an unsaturated ester of aliphatic acid $$(CH_2=CH(CH_2)_mOOCR)$$

is carried out in the presence of or absence of a free-radical catalyst such as azobisisobutyroamidine dihydrochloride, azobisisobutyronitrile, benzoylperoxide, tertiary-butylhydroperoxide, ditertiarybutylperoxide, and the like organic azo or organic peroxide compounds. When said catalyst is employed, a reaction temperature of from 20° to 180° C. is usually applied, preferably from 40° to 150° C. is usually applied, but when the reaction is carried out in the absence of the catalyst a higher temperature such as 130° to 250° C., preferably 150° to 200° C., is usually applied. The reaction pressure is not critical and varies over a wide range, but an atmospheric pressure is usually applied.

When unsaturated compounds are used in or prepared from said processes, "process-A," "process-B" and "process-C," one or more of polymerization inhibitors, such as, copper powder, hydroquinone, amines, etc., may be added to the reaction system so as to prevent the polymerization of said compounds.

In the case that the "process-A" or "process-B" is the first process of the reactions, the intermediate resulting from the "process-A," "process-B" or "process-C" is subjected to the subsequent second process as it is or after the separation thereof from the resultant reaction mixture.

The desired esters of the present invention and the intermediates thereof can be separated by various conventional methods known to the art according to the corresponding processes, "process-A," "process-B" and "process-C."

The desired ester or the intermediate obtained by "process-A" can be separated, for example, by pouring the mixture resulting from said "process-A" to a cold water and distilling the oil-layer separated from the water-layer. The desired ester or the intermediate obtained by "process-B" or "process-C" can be separated from the mixture resulting from said each process by a rectification, reprecipitation or recrystallization.

In either case, when the reaction mixture resulting from the each process, "process-A," "process-B" or "process-C," contains an unsaturated compound as an intermediate or the desired product, the rectification or distillation thereof is desirably carried out for the mixture containing a polymerization inhibitor which has been added before or after said each reaction process.

The advantages of the methods shown in the Equations 1 to 4 for the synthesis of the present esters are that a fluorinated haloalkanol having the formula of $R_1CH_2CHX(CH_2)_n \cdot OH$, employed as a starting material, can be easily prepared by a single reaction of a perfluoroalkyl halide ($R_fX$) or a perfluoroalkyl sulfonyl halide ($R_fSO_2X$) with an unsaturated alcohol $$(CH_2=CH(CH_2)_{m'}OH)$$

(a) $R_fX + CH_2=CH(CH_2)_{m'}OH \rightarrow R_fCH_2CHX(CH_2)_{m'}OH$ (b) $R_fSO_2X + CH_2=CH(CH_2)_{m'}OH \rightarrow R_fCH_2CHX(CH_2)_{m'}OH$ wherein $R_f$, X, and $m'$ are as defined before. Conventional free-radical catalysts, such as, peroxides or organic azo compounds are advantageously used for said reaction. The detailed explanation for this reaction is given hereinafter in the examples.

The advantages of the methods shown in the Equations 5 and 6 for the synthesis of the present esters are that the intermediate, $R_fCH_2CHX(CH_2)_mOOCR$, can be directly prepared from $R_fX$ or $R_fSO_2X$ which is available.

The compounds $R_fX$ and $R_fSO_2X$, are known in the art. The compound, $R_fX$, is readily prepared by telomerization reaction of tetrafluoroethylene with a compound such as $$\begin{array}{c} CF_3 \\ \diagdown \\ CF_3X, \quad \phantom{x}CFX \\ \diagup \\ CF_3 \end{array}$$

$CF_3CF_2X$, etc.

The compound, $R_fSO_2X$, is easily derived from $$R_fSO_2F$$

prepared by electrolytic fluorination of the corresponding aliphatic sulfonyl halide.

The number of carbon atoms in the perfluoroalkyl groups ($R_f$) contained in the molecules of the present esters should be confined to from 3 to 21, preferably from 4 to 13, whereby said esters can be easily produced and the polymers prepared from said esters display an excellent hydrophobic and oleophobic property. The perfluoroalkyl groups ($R_f$) include straight-chain perfluoroalkyl groups $F(CF_2)_q-$ and branched-chain perfluoroalkyl groups such as $$\begin{array}{ccc} CF_3 & CF_3 & CF_3 \\ \diagdown & | & | \\ CF(CF_2)_{q'}, & CF_3-CF_2-CF_2-C-, & CF_3CF_2CF_2(CF_2-CF)_2 \\ \diagup & | & \\ CF_3 & CF_3 & \end{array}$$

etc., wherein $q$ is an integer of from 3 to 21 and $q'$ is an integer 0 to 18, although esters containing a perfluoroalkyl group of $$F(CF_2)_q- \quad \text{or} \quad \begin{array}{c} CF_3 \\ \diagdown \\ CF(CF_2)_{q'}- \\ \diagup \\ CF_3 \end{array}$$

are preferred. Particularly desired esters of this invention are those having the formulas of $$F(CF_2)_qCH_2CHOOCCH=CH_2, \quad F(CF_2)_qCH_2CHOOCC\overset{CH_3}{\underset{|}{=}}CH_2$$
$$\phantom{F(CF_2)_qCH_2}\underset{CH_2OOCR}{|} \qquad \phantom{F(CF_2)_qCH_2}\underset{CH_2OOCR}{|}$$

$$\begin{array}{c}CF_3\\\diagdown\\CF(CF_2)_{q'}\cdot CH_2CHOOCCH=CH_2 \quad \text{and}\\\diagup\phantom{xxxxxxx}|\\CF_3\phantom{xxxxxxx}CH_2OOCR\end{array}$$

$$\begin{array}{cc}CF_3 & CH_3\\\diagdown & |\\CF(CF_2)_{q'}\cdot CH_2CHOOCC=CH_2\\\diagup\phantom{xxxxxxx}|\\CF_3\phantom{xxxxxxx}CH_2OOCR\end{array}$$

The representative esters of this invention are exemplified as follows:

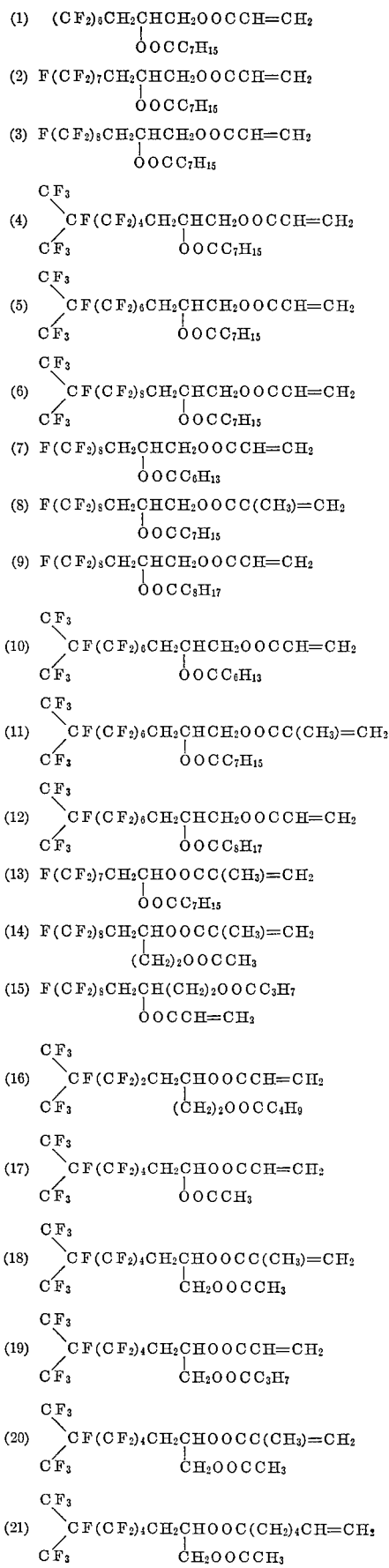

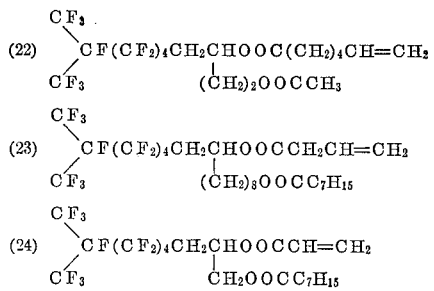

The esters of this invention are readily polymerized by the methods known to the art, for example, by bulk polymerization, solution polymerization, emulsion polymerization and suspension polymerization, using either free-radical catalysts, ultra-violet rays, ionizing radiations or heat. Said esters are polymerized either singly or in admixture with each other or with copolymerizable monomers of other kinds which contain an ethylenic linkage in the molecules, to yield novel homopolymers or copolymers of this invention. Said copolymerizable monomers include (1) acrylic acid, methacrylic acid or such esters thereof as methyl, ethyl, butyl, isobutyl, propyl, 2-ethylhexyl, hexyl, decyl, lauryl, stearyl, glycidyl, etc.; (2) vinyl esters of aliphatic acids such as vinyl acetate, vinyl propionate, vinyl caprylate, vinyl laurate, vinyl stearate, etc.; (3) styrene or styrene compounds such as α-methylstyrene, p-methylstyrene, etc.; (4) halogenated vinyl or halogenated vinylidene compounds such as vinyl fluoride, vinyl chloride, vinyl bromide, vinylidene fluoride, vinylidene chloride, etc.; (5) allyl esters of aliphatic acids such as allyl heptanoate, allyl caproate, allyl caprylate, etc.; (6) vinylalkyl ketones such as methylvinyl ketone, ethylvinyl ketone, etc.; (7) acrylamides such as IN-methyl acrylamide, N-methylol acrylamide, etc.; (8) diene compounds such as butadiene, 2,3-dichloro-1,3-butadiene, isoprene, etc.; and (9) fluorinated unsaturated esters such as $R_f(CH_2)_zOOCCR'=CH_2$, $$R_fCH=CH(CH_2)_zOOCCR'=CH_2$$

(wherein $R_f$ and $R'$ are as defined before, Z is an integer from 1 to 10), etc. The copolymer of 99 to 25 weight percent of the present monomer and 1 to 75 weight percent of a comonomer containing no fluorine in the molecule, (1) to (8) above, exhibits sufficient oil-repellency, although the copolymer containing less than 25 weight percent of the present monomer exhibits poor or no oil-repellency.

Of polymerization methods as stated before, the most desirable one is an emulsion polymerization for which a conventional technique used in the emulsion polymerization of vinyl compounds is applicable. For instance, one or more of the present monomers to be polymerized are dispersed in an aqueous medium having dissolved therein dispersants and free-radical catalysts, if necessary, and polymerized. The dispersants employed include those compounds being anionic, cationic or non-ionic surfactants. The desirable anionic surfactant is a sodium salt of sulfated alkenyl ($C_{16}$ to $C_{18}$) acetate, sodium oleate, sodium salt of sulfated methyloleate, an ammonium ω-hydropolyfluoroalkanoate ($C_7$ to $C_{13}$), an ammonium perfluoroalkanoate ($C_5$ to $C_{13}$), a sodium alkyl ($C_{10}$ to $C_{18}$) sulfate, a sodium alkyl ($C_{12}$ to $C_{18}$) benzene sulfonate, or a sodium alkyl ($C_{12}$ to $C_{18}$) naphthalene sulfonate, etc. The desirable cationic surfactant is (dodecylmethylbenzyl)trimethylammonium chloride, benzyldodecyldimethylammonium chloride, N-[2-(diethylamino)-ethyl]-oleoamide hydrochloride, dodecyltrimethylammonium acetate, trimethyltetradecylammonium chloride, hexadecyltrimethylammonium chloride, or trimethyloctadecylammonium chloride, etc. The desirable non-ionic surfactant is a condensate of polyethylene oxide and hexyl phenol, isooctyl phenol, hexadecanol, oleic acid, an alkan ($C_{12}$ to $C_{16}$) thiol, or an alkyl ($C_{12}$ to $C_{18}$) amine of 12 to 18 carbon atoms.

The free-radical catalysts employed include those compounds known to the art for the polymerization of conventional vinyl compounds, for example, benzoyl peroxide, lauroyl peroxide, tertiarybutyl perbenzoate, 1-hydroxycyclohexylhydroperoxide, potassium persulfate, ammonium persulfate, etc.

The polymerization temperature varies over a wide range according to the kinds of monomers, dispersants and catalysts employed, but in emulsion polymerization a temperature of from 10° to 80° C. is usually employed, although 15° to 70° C. is preferred. The pressure is not critical and varies over a wide range but an atmospheric pressure is usually applied in emulsion polymerization.

The polymers of this invention, including both homopolymers and copolymers are characterized by the presence of the skeletal chain of recurring or repetitive units which can be represented as follows:

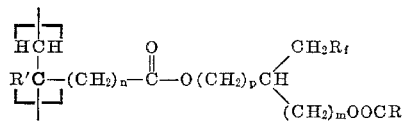

wherein $R_f$, R, R', m, p and n are as defined before. The homopolymers contain these recurring units attached to one another by the valence bonds shown in the above formula, and the copolymers contain these groups interspersed with groups derived from copolymerizable monomers employed.

The polymers of this invention have markedly excellent water- and oil-repellent property due to a multiplicity of perfluoroalkyl side chains ($R_f$), and further have specific characteristics due to acyloxyl side chains (RCOO—). For instance, the polymers of this invention have good affinity for conventional organic solvents as well as fluorinated solvents due to the presence of acyloxyl side chains in the polymer molecules, so that the polymers can be easily dissolved at a room temperature or at an elevated temperature in one or more species of such conventional organic solvents as acetone, methylethyl ketone and the like ketones, diethylether and the like ethers, etc. as well as such fluorinated solvents as trifluorotrichloroethane, etc., making it possible to extend the fields of application thereof. Further, the polymers also have good affinity for fibrous, porous or the like solid materials, rendering it possible to impart durability in water- and oil-repellency to such materials. Furthermore, an aqueous emulsion of the polymer prepared by emulsion polymerization is very stable, so that said emulsion can be employed as a water- and oil-repellent composition without any further after-treatment and without the loss of polymers due to coagulation thereof.

It is easily understood by one skilled in the art that these specific characteristics of the present polymers make them especially suitable for the preparation of water- and oil-repellent compositions.

Water- and oil-repellent compositions containing the present polymers are of various forms, such as aqueous emulsions, organic solvent solutions or self-pressurized sprayable products, "aerosols." An aqueous emulsion prepared by emulsion polymerization may be advantageously used as it is, or may be diluted or concentrated. There may be added stabilizers, pH adjusters and/or other water- or oil-repellent compounds known to the art, where necessary. The aqueous emulsion can be also prepared by dispersing the polymer powder in an aqueous medium. An organic solvent solution is prepared by dissolving the polymer at an atmospheric or elevated temperature in one or more of such organic solvents as stated before. In preparation of aerosols, a propellant such as dichlorodifluoromethane, monofluorotrichloromethane, dichlorotetrafluoroethane, etc., is added to such solution. The solutions and aerosols can be easily prepared as the polymer of this invention is soluble in wide variety of solvents.

The water- and oil-repellent compositions of this invention may be applied to the solid materials by painting, dipping or spraying at room temperatures, or at elevated temperatures conventional in the art. The materials to be treated include fibrous or other porous or non-porous materials such as woven fabrics, knit fabrics, papers, fibre-boards, felts, etc., made of natural fibres such as cellulose, cotton, wool, etc., fully synthetic fibres such as polyamides, polyesters, polyacrylonitriles etc. and/or partially synthetic fibers such as cellulose acetate, cellulose propionate, etc.; leathers; and goods made of glass, woods, etc.

The coated materials thus obtained are dried at room temperatures or at elevated temperatures and further, if necessary, a curing process may be applied. During or after the curing, a soaping process may also be applied, as required. The drying may be accomplished or accelerated by the application of mild heating (usually 80° to 150° C.), a current of air or other inert gas, reduced pressure or by a combination of such means. The curing process is usually required if emulsion-type compositions are used, thereby the polymer particles coalesce each other to form a continuous polymer layer firmly attached to the coated materials. Said process is carried out by heating the materials at 80° to 220° C., preferably at 100° to 150° C., for 1 to 20 minutes. The soaping process is also required in using emulsion-type compositions, if necessary, whereby dispersants and polymerization initiators contained in emulsions are washed out. Said process is usually carried out by washing the materials with a 0.1 to 0.5 weight percent aqueous solution of a neutral detergent at 40° to 60° C. for 10 seconds to 5 minutes. There is no need, as a rule, to apply said curing and soaping processes, if solution-type or aerosol-type compositions are used.

Aforementioned treating methods are illustrative only and we do not intend to limit this invention to the same, as there are various other modifications which are readily apparent to those skilled in the art.

The thus treated materials, which are coated with the polymers of this invention, display a markedly excellent water- and oil-repellent property due to the perfluoroalkyl side chain ($R_f$) exposed on the outer surface of the treated materials. For instance, drops of water or oil deposited on the surface will remain or run off rather than spreading and wetting the surface. This excellent water- and oil-repellent property is secured when the polymer of this invention is attached to the materials in the range of only from 0.1 to 5 weight percent based on the weight of the materials, although said water- and oil-repellent property will increase if a greater amount of polymer is attached.

The water- and oil-repellent compositions of the invention may be also employed with other known water-repellent and/or oil-repellent agents, whereby the treated materials increase in water- and/or oil-repellent effects and in particularly durability for washing and dry-cleaning in many cases. The most desirable known agents are quaternary pyridinium salts having a higher alkyl group of 12 to 20 carbon atoms. For instance there are exemplified compounds having the formula of

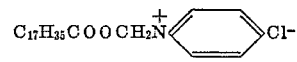

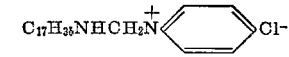

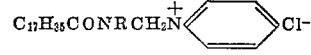

etc. which are known to the art as a water-repellent agent and available under the trade name "Norane R" (trademark of Warwick Chemical Co., U.S.A.), "Zelan AP" (trademark of E. I. du Pont de Nemours & Co., U.S.A.)

and "Velan PF" (trademark of Imperial Chemical Industries Ltd., U.K.).

The treatment with the known water- and/or oil-repellent agents is preferably applicable before or after the treatment with the present compositions by two-step treatment, although it is also applicable during the treatment with the present compositions by one-step treatment.

EXAMPLE 1

(This example provides a detailed illustration of the general procedure previously described and relates specifically to the production of the starting fluorinated haloalkanol,

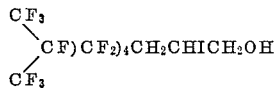

the present monomer,

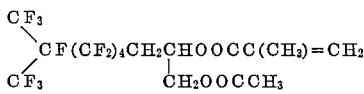

and the polymer prepared therefrom)

(1)

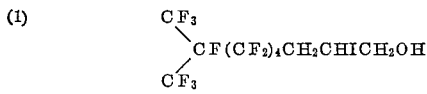

682 grams (1.377 mole) of

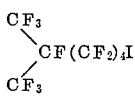

were placed in a 500 milliliter 4-necked flask equipped with a reflux condenser, thermometer, dropping funnel, nitrogen gas injector and agitator and the temperature in the flask was gradually elevated to 50° C. with stirring in nitrogen stream introduced from the injector. At such temperature, a suspension prepared by suspending 3.39 grams of azobisisobutyronitrile in 40.0 grams of allyl alcohol was added dropwise. A violent exothermic reaction occurred immediately and the reaction system was cooled with water as required. After 1.5 hours when generation of heat due to the exothermic reaction was terminated, a further quantity of azobisisobutyronitrile in the form of a suspension prepared by suspending 1.4 grams of azobisisobutyronitrile in 24.0 grams of allyl alcohol was added to the reaction system and the mixture stirred at 70~82° C. for 1 hour and 20 minutes. Thereafter, in addition a suspension prepared by suspending 0.85 gram of azobisisobutyronitrile in 16.0 grams of allyl alcohol was added to the system and the mixture stirred at 77 ~80° C. for 3 hours. The resultant reaction mixture was cooled to a room temperature and filtered to remove solid materials, such as, residue of the catalyst employed. The filtrate was distilled under reduced pressure to remove unreacted starting materials, yielding 681 grams of a product,

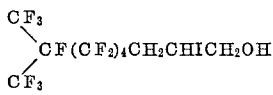

as a distillate boiling at 88°~90° C./1.3~1.5 mm. Hg.
Analysis gave the following values:

Calcd. for $C_{10}F_{15}H_6OI$ (percent): C, 21.6; F, 51.4; I, 22.9; H, 1.08. Found (percent): C, 20.2; F, 50.9; I, 23.0; H, 1.17.

Infrared absorption spectra showed the presence of —OH, —$CH_2$—, $CF_3$— and —$CF_2$— groups.

(2)

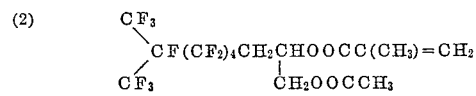

277 grams of

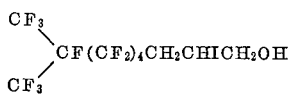

74 grams of $CH_3COOK$ and 650 milliliters of isoamylalcohol were placed in a 2 liter "Hastelloy-C" (registered trademark) autoclave and the mixture stirred at 150° C. for 5 hours. The resultant mixture was cooled to room temperature and poured into 2 liters of a cold water. The oil-layer was dried with anhydrous magnesium sulfate. By rectification thereof, isoamylalcohol was recovered, and 225 grams of a distillate of 96°~97° C./2 mm. Hg were obtained.

Analysis showed the following values:
Calcd. for $C_{12}F_{15}H_9O_3$ (percent): C, 29.6; F, 58.6; H, 1.9; O, 9.8. Found (percent): C, 30.1; F, 57.2; H, 1.9; O, 10.8.

Infrared absorption spectra showed the presence of perfluoro alkyl, acetyl and hydroxyl groups.

Thus said distillate was confirmed to be the intermediate,

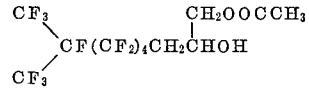

200 grams of

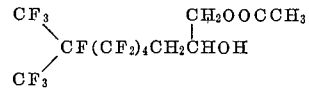

0.3 gram of copper powder, 0.5 gram of hydroquinone and 54 grams of $CH_2{=}C(CH_3)COCl$ were placed in a 300 milliliter 4-necked flask equipped with a reflux condenser connected to a trap containing aqueous solution of alkali, thermometer and stirrer, and the mixture was heated with stirring at 60°~85° C. until the generation of hydrogen chloride ceased.

The resultant mixture was distilled under reduced pressure, yielding 209 grams of a distillate boiling at 95~97° C./0.2 mm. Hg. The distillate was confirmed to be

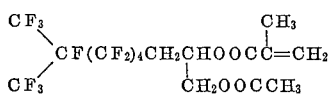

by programmed temperature gas chromatographic analysis, elementary analysis and infrared spectroscopic analysis.

(3) Homopolymer 160 grams of

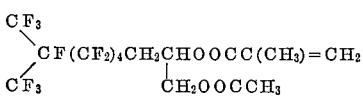

6 grams of $(CF_3)_2CF(CF_2)_4COONH_4$, 0.35 gram of potassium persulfate, 0.25 gram of l-ascorbic acid, 600 grams of deoxidated distilled water and 45 grams of acetone were placed in a 1 liter 4-necked flask, and the air in the flask was replaced with nitrogen gas. The mixture was stirred at 15° to 17° C. for 10 hours and 30 minutes, whereby the polymer emulsion of 18.7 weight percent concentration was obtained.

Methanol was added to said emulsion and shaken to coagulate the polymer. The polymer deposited was a resin-like substance in high yellow color and soluble in $C_2Cl_3F_3$ and acetone but insoluble in methanol and water. The polymer was confirmed to be a homopolymer of said monomer by infrared spectroscopic analysis and elementary analysis.

to 1 weight percent polymer concentration, in which a cotton gaberdine cutting was dipped and after lightly squeezed, dried in the air then heated at 150° C. for 3 minutes. After soaping it with a 0.5 weight percent aqueous solution of a neutral detergent at 50° C. for 5 minutes, it was washed with water and dried.

The cotton gaberdine thus treated exhibited no changes in touch, color and strength, and showed 100 marks of water-repellency by AATCC Spray Test 22-1952, and excellent oil-repellency also.

To ascertain the resistance of the polymer to washing, the sample treated as above was after curing further washed with a 0.05 weight percent aqueous solution of a neutral detergent at about 40° C. 5 times, then washed with hot water at 50° C., and dried in the hot air at 100° C. The above repeated treatment was counted as 1 cycle, and after several cycles of the above treatment its water-repellency and oil-repellency were checked.

Similar treatments were conducted by using a 1 weight percent polymer emulson of a copolymer of 93 weight percent of said present monomer and 7 weight percent of methylmethacrylate (copolymer-1) and of a copolymer of 95 weight percent of said present monomer and 5 weight percent of chloroplene (copolymer-2) respectively, and the results in comparison of these treatments are given in Table 1.

TABLE 1

| Polymer tested | Item of test | Cycle of washing | | |
|---|---|---|---|---|
| | | 0 | 1 | 3 |
| Homopolymer | Water-repellency | 50 | 100 | 100 |
| | Oil-repellency | 130 | 140 | 140 |
| Copolymer-1 | Water-repellency | 50 | 100 | 90 |
| | Oil-repellency | 120 | 140 | 130 |
| Copolymer-2 | Water-repellency | 60 | 100 | 90 |
| | Oil-repellency | 120 | 140 | 140 | wherein:

Water-repellency: By AATCC Spray Test 22-1952.
Oil-repellency: With a volume ratio mixture of liquid paraffin and n-heptane at varying mixing proportions and evaluated as follows in Table 2:

TABLE 2

| Oil-repellency | Liquid paraffin | n/heptane |
|---|---|---|
| 0 | (¹) | |
| 50 | 100 | 0 |
| 60 | 90 | 10 |
| 70 | 80 | 20 |
| 80 | 70 | 30 |
| 90 | 60 | 40 |
| 100 | 50 | 50 |
| 110 | 40 | 60 |
| 120 | 30 | 70 |
| 130 | 20 | 80 |
| 140 | 10 | 90 |
| 150 | 0 | 100 |

¹ Infiltrates even 100 percent liquid paraffin.

From the above results it can be understood that the polymer of the invention is capable of always giving high water-repellency and oil-repellency to the treated goods and even after 3 cycles of said washing its high oil-repellency is not substantially lessened.

EXAMPLE 2

(This example illustrates the production of the starting compound,

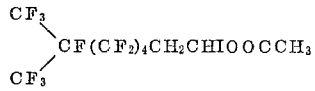

the present monomer,

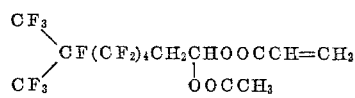

and the polymer thereof)

(1)  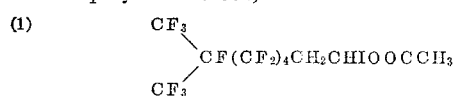

300 grams of

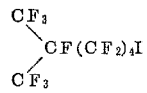

0.5 gram of hydroquinone and a solution of 2.0 grams of azobisisobutyronitrile in 49.3 grams of vinyl acetate (CH₂=CHOOCCH₃) were placed in a 500 milliliter 4-necked flask equipped with a reflux condenser, thermometer, stirrer and nitrogen gas injector, and the temperature in the flask was gradually raised to about 50° C. in nitrogen stream. A violent exothermic reaction occurred, and the reaction system was maintained at 60° to 70° C. by cooling the system with water. After about 1 hour when generation of heat due to the exothermic reaction was terminated, the additional stirring was continued at such temperature for further 3 hours.

The resultant reaction mixture was cooled to room temperature and filtered to remove solid materials. The filtrate was distilled under reduced pressure, yielding 293 grams of a distillate boiling at 80° to 82° C./3.0 mm. Hg.

Elementary analysis gave the following values:

Calcd. for $C_{11}F_{15}H_6O_2I$ (percent): C, 22.6; F, 49.2; H, 1.0; O, 5.5; I, 21.7. Found (percent): C, 22.6; F, 49.4; H, 1.0; O, 5.1; I, 21.9.

Infrared spectroscopic analysis showed the presence of $$-\underset{\underset{O}{\|}}{C}-O-, \quad -CH_2-, \quad \begin{matrix}CF_3\\ \diagdown\\ \diagup\\ CF_3\end{matrix}CF(CF_2)_4-$$

groups.

Thus said distillate was confirmed to be

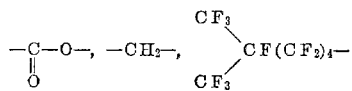

(2) 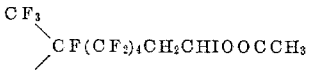

58 grams (0.1 mole) of

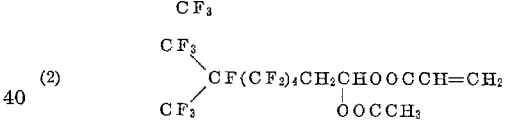

28 grams (0.3 mole) of sodium acrylate (CH₂=CHCOONa)

350 grams of a 1:1 weight ratio mixture of isoamylalcohol and H(CF₂)₄CH₂OH and 0.05 gram of hydroquinone were placed in a 1-liter 3-necked flask equipped with a reflux condenser and thermometer and the mixture heated with stirring at 105° to 110° C. for 6 hours. The resultant mixture was cooled to room temperature and poured into 2 liters of cold water. The oil-layer was separated and dried with anhydrous magnesium sulfate. By distillation thereof under reduced pressure, 18 grams of distillate boiling at 113°~114° C./1.9 mm. Hg was obtained. The distillate was confirmed to consist almost of a single component by gas chromatographic analysis and was a viscous liquid at room terperature.

Infrared spectroscopic analysis showed the following results:

Absorption due to —CH₂— at 3.45μ,

at 5.75μ and 5.85μ, CH₂=CH— at 6.15μ, and

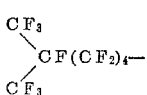

at 7.85μ, 8.0μ and 10.2μ.

Elementary analysis gave the following values:
Calcd. for $C_{14}F_{15}H_9O_4$ (percent): C, 32.0; F, 54.2; H, 1.7; O, 12.1. Found (percent): C, 32.3; F, 53.8; H, 2.0; O, 11.9.

Thus said distillate was confirmed to be

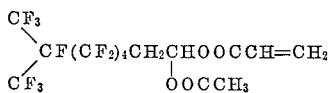

(3) Homopolymer

A solution prepared by dissolving 10 grams of

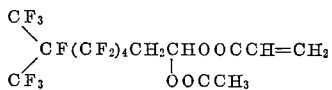

in a mixture of 85 grams of $C_2F_3Cl_3$ and 5 grams of acetone was placed in a glass ampoule and the ampoule sealed up. Then the ampoule was placed at a distance of 1 meter from the source of γ-rays of $Co^{60}$ and irradiated with agitating under a dose rate of $8\times10^4$ r./hr. for 1 hour at room temperature (25° C.). After irradiation the system was further left to polymerize for about 30 minutes whereby a transparent polymer solution having polymer concentration of 10 weight percent was obtained.

A part of the polymer solution was dried in a drier at 60° C. under reduced pressure until the weight of the polymer residue indicated a constant value. The polymer was a light brown resin-like mass softening at 60° C.

Infrared absorption spectra showed almost same results as the monomer, except no absorption due to $CH_2=CH-$ was found which should have been found at or near 6.15μ. Elementary analysis showed 31.5 percent carbon, 53.5 percent fluorine, 1.5 percent hydrogen and 13.5 percent oxygen. Thus the polymer obtained was confirmed to be a homopolymer of

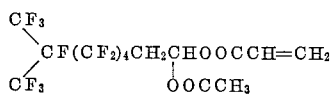

Said polymer solution was diluted with $C_2F_3Cl_3$ to a polymer concentration of 1 g./100 ml. A nylon cloth, filter paper, cotton gauze and asbestos cloth were immersed in such diluted solution, taken out and dried in air. The samples thus treated exhibited almost no changes in color and strength and little harder in touch, but exhibited extremely high water- and oil-repellency, sustaining drops of water, ink, whisky, n-decane, kerosene oil, machine oil and tetrachloroethylene without any infiltration.

EXAMPLE 3

(This example illustrated the production of

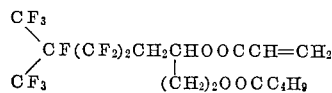

and the polymer thereof)

(1) 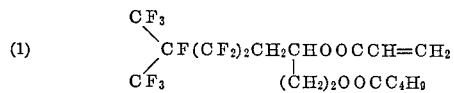

150 grams of

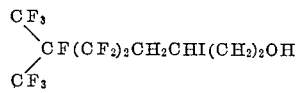

63 grams of $C_4H_9COOK$ and 650 grams of isoamylalcohol were placed in a 1-liter 4-necked flask with a reflux condenser and thermometer and the mixture maintained with thorough stirring at a reflux temperature for 8 hours. The resultant reaction mixture was cooled to room temperature and poured into cold water. The oil-layer was washed with water twice, and dried with anhydrous magnesium sulfate and distilled under reduced pressure, isoamylalcohol was removed therefrom, and finally 117.5 grams of a distillate boiling at 102°~106° C./0.2 mm. Hg were obtained.

Infrared spectroscopic analysis showed absorptions at 3.03μ due to —OH, at 5.75μ due to

at 3.47μ due to —$CH_2$—, and at 8.0μ and 10.2μ due to

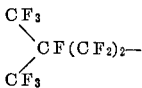

Elementary analysis gave:
Calcd. for $C_{14}F_{11}H_{17}O_3$ (percent: C, 38.0; F. 47.3; O, 10.9; H, 3.8. Found (percent): C, 38.7; F, 46.1; O, 11.2; H, 4.0.

Thus said distillate was confirmed to be

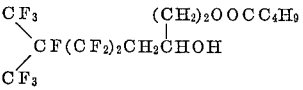

100 grams of the resultant product, 37 grams of $CH_2=CHCOCl$, 0.5 gram of fine copper powder and 0.8 gram of hydroquinone were placed in a 200 milliliter 4-necked flask, and the mixture heated with stirring at 75°~85° C. for 6 hours. Said flask was equipped with agitator, reflux condenser, thermometer and trap containing aqueous solution of alkali which connected to the top of reflux condenser. Hydrogen chloride gas generated by the reaction was neutralized by the aqueous solution of alkali in trap, and after 5 hours of reaction generation of hydrogen chloride gas ceased. The product thus reacted was rectified under reduced pressure, and 85 grams of a distillate of 113°~1175 C./0.10~0.15 mm. Hg. were obtained. The distillate was confirmed by gas chromatographic analysis to consist substantially of a single component, and by infrared spectroscopic analysis to show absorptions at 3.45μ due to —$CH_2$—, at 5.75 and 5.85μ due to

at 6.15μ due to $CH_2=CH-$, and at 7.85μ, 8.5μ and 10.2μ due to

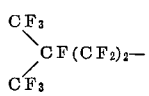

Elementary analysis gave (percent): C, 41; F, 42; O, 13; H, 4. Calculated values for $C_{17}F_{11}H_{19}O_4$ (percent): C, 41.2; F, 42.1; O, 12.9; H, 3.8.

Further, the product was found to have a double bond of —C=C— by extinguishment of color of bromine in bromination addition.

From the above results said product was confirmed to be.

25 grams of

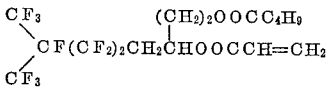

(2) Homopolymer 200 grams of deoxidated distilled water, 12 grams of acetone and 7 grams of $(CF_3)_2CF(CF_2)_4COONH_4$ were placed in a 4-necked flask with agitator, thermometer, dropping funnel, nitrogen gas injector and reflux condenser, and the mixture heated with thorough stirring in nitrogen stream to 60° C. Thereafter 1 gram of ammonium persulate was further added thereto, about 20 minutes after which the mixture turned white fluorescent in color, and the polymerization began with some exothermic reaction which about 3 hours after ceased, and an opaque emulsion was produced, fairly stable and containing 10.0 weight percent of the polymer.

The identification of the polymer was confirmed by infrared spectroscopic analysis and elementary analysis of the solids which were separated from a substance coagulated by stirring a part of said emulsion with methanol.

Said emulsion was diluted with water to 0.8 weight percent polymer concentration, in which was dipped a cotton cloth cutting for 3 minutes, then lightly squeezed, pre-died at 70°~80° C. and heated at 150° C. for 6 minutes to cure the polymer attached thereon.

The cutting thus treated exhibited almost no changes in touch, strength, etc., and excellent water-repellency and oil-repellency, sustaining drops of a 3:7 volume ratio mixture of liquid paraffin and n-heptane for more than 24 hours without infiltration, and excellent washing resistance, and its water-repellency and oil-repellency showed almost no decline after washing by an electric washing machine with an aqueous solution of a neutral detergent at 40° C. for 3 minutes.

Another treatment was run in the following manner by employing 2 baths: the first bath consisting of 10 grams of said emulsion containing 10.3 weight percent of the polymer, 4 milliliters of isobutylalcohol, 0.1 gram of "Scourol 100" (trademark for nonionic surfactant (polyoxyethylenelauryl ether) of Kao Soap Co., Ltd., Japan), 0.3 gram of sodium acetate, 0.3 gram of acetic acid and 90 grams of distilled water thoroughly mixed, and the second bath consisting of 100 grams of an aqueous solution containing 6 grams of "Zelan AP" (trademark for water-repellent ((C$_{17}$H$_{35}$CONRCH$_2$NC$_5$H$_5$)+Cl$^-$) of E. I. du Pont de Nemours & Co., U.S.A.), 1.0 gram of "Sumitex Resin M-3" (trademark for aqueous emulsion of melamine precondensate of Sumitomo Chemical Co., Ltd., Japan), and 0.1 gram of "Sumitex ACX" (trademark for curing agent of Sumitomo Chemical Co., Ltd., Japan) and 1.2 grams of sodium acetate. A cotton cloth cutting 10 cm. x 10 cm. was dipped in the first bath, then predried at 80°~85° C., and heated at 150° C. for 4 minutes to cure the polymer attached thereon, after which it was soaped with an aqueous solution containing 0.3 weight percent of a neutral detergent and 0.2 weight percent of soda ash at 50° C. for 1 minute and then thoroughly dried.

Said cutting was further dipped in the second bath, and then similarly pre-dried and then heated at 160° C. for 3 minutes, and again similarly soaped. The sample thus treated indicated strong resistance to washing, and showed no substantial changes in performance even after 5 washings with a solution of a neutral detergent or after 5 dry-cleanings with tetrachloroethylene.

EXAMPLE 4

(This example illustrates the production of the present monomer, $$\text{F(CF}_2)_7\text{CH}_2\text{CHOOCC(CH}_3)=\text{CH}_2$$
$$|$$
$$\text{OOC}_7\text{H}_{15}$$

and the polymer thereof)

(1) $\text{F(CF}_2)_7\text{CH}_2\text{CHOOCC(CH}_3)=\text{CH}_2$
     $\quad\quad\quad\quad\quad |$
     $\quad\quad\quad\quad\quad \text{OOC}_7\text{H}_{15}$ F(CF$_2$)$_7$CH$_2$CHIOOCC$_7$H$_{15}$ was prepared from $$\text{F(CF}_2)_7\text{I}$$

and $$\text{CH}_2=\text{CHOOCC}_7\text{H}_{15}$$

in the manner as Example 2-(1).

66 grams (0.1 mole) of F(CF$_2$)$_7$CH$_2$CHIOOCC$_7$H$_{15}$, 37 grams (0.3 mole) of potassium methacrylate, 500 grams of isoamylalcohol and 0.5 gram of hydroquinone were placed in a 1-liter 4-necked flask equipped with a reflux condenser, thermometer and stirrer and the mixture violently stirred at reflux temperature for 6 hours. The resultant mixture was cooled to room temperature and poured into 5 liters of cold water. The oil-layer was separated and dried with anhydrous magnesium sulfate. Removal of low-boiling materials such as isoamylalcohol gave as a residue a brown viscous liquid. The residue was rectified and a distillate boiling at 110°~115° C./ 0.010~0.015 mm. Hg was obtained. The distillate was confirmed to have more than 98 percent purity by gas chromatographic analysis.

Infrared spectroscopic analysis showed absorption due to —CH$_2$— at 3.5$\mu$,

at 5.78$\mu$ and 5.87$\mu$,

at 6.15$\mu$ and F(CF$_2$)$_7$—at 8~9$\mu$.

Elementary analysis gave the following values:
Calcd. for C$_{20}$F$_{15}$H$_{23}$O$_4$ (percent): C, 38.2; F, 46.6; H, 3.8; O, 10.4. Found (percent): C, 40.3; F, 45.7; H, 4.0; O, 10.0.

Thus the substance was confirmed to be

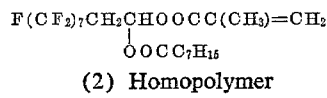

(2) Homopolymer

A solution prepared by dissolving 10 grams of

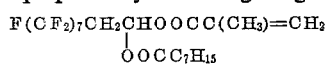

in a mixture of 85 grams of C$_2$F$_3$Cl$_3$ and 5 grams of acetone was placed in a glass ampoule and the ampoule was sealed up. The ampoule was irradiated for 20 hours by ultra-violet rays of a 400 watt mercury lamp placed at a distance of 40 cm. from the ampoule. After irradiation, a light yellowish viscous liquid was obtained. A part of the polymer solution was dried in a drier at 60° C. under reduced pressure until the weight of the polymer residue indicated a constant value. The residue was light yellow resin-like mass softening at 50° C.

The substance was confirmed to be homopolymer of

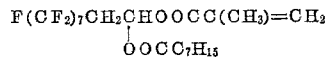

by infrared spectroscopic analysis and elementary analysis.

EXAMPLE 5

(This example illustrates the production of the present monomer,

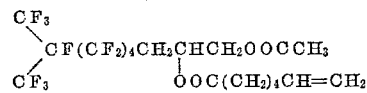

and the polymer thereof)

(1) 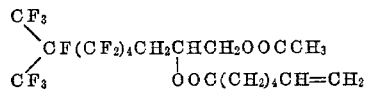

(1-a) 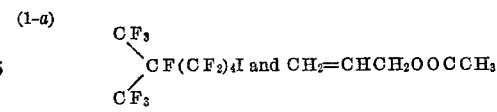

were reacted at 60°~70° C. in the presence of azobisisobutyronitrile in the manner as Example 2-(1), whereby

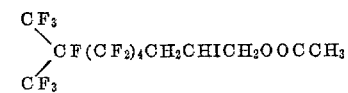

was obtained.

80 grams of

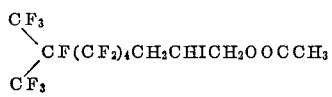

50 grams of $CH_2=CH(CH_2)_4COOK$, 300 grams of $H(CF_2)_4CH_2OH$, 100 grams of isoamylalcohol and 0.3 gram of hydroquinone were placed in a 0.5-liter 4-necked flask equipped with a reflux condenser, thermometer and stirrer and the mixture was heated with stirring at 110° to 115° C. for 7 hours. The resultant mixture was cooled to room temperature and a large part of isoamylalcohol was recovered by distillation under reduced pressure. The residue was poured into 1 liter of cold water and the oil-layer was separated. The water-layer was treated with $C_2F_3Cl_3$ and the $C_2F_3Cl_3$ extract was combined with said oil-layer. The combined extract was dried with anhydrous sodium sulfate and distilled in vacuo, yielding 35 grams of a distillate of 104°~110° C./0.025~0.035 mm. Hg.

The distillate was confirmed to be a single component by gas chromatographic analysis and to be $$\underset{CF_3}{\overset{CF_3}{\diagdown}}CF(CF_2)_4CH_2CHCH_2OOCCH_3$$
$$\qquad\qquad\qquad\quad\overset{|}{O}OC(CH_2)_4CH=CH_2$$

by infrared spectroscopic analysis and elementary analysis.

350 grams of (1-b) 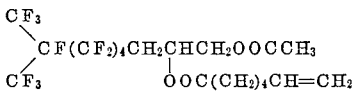

and 0.3 gram of hydroquinone were placed in a 500 milliliter 4-necked flask equipped with a reflux condenser connected to a hydrogenchloride-accepting trap, stirrer, thermometer, dropping funnel and nitrogen gas injector, 60 grams of $CH_3COCl$ was added dropwise to the mixture with stirring in nitrogen stream at 45°~50° C. The stirring was continued at 50°~56° C. until generation of hydrogenchloride was terminated. The resultant mixture was rectified under reduced pressure, whereby 320 grams of

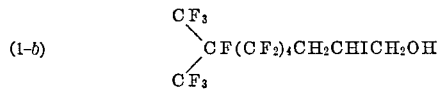

was obtained as a distillate boiling at 93°~97° C./2.7~3.1 mm. Hg.

The identification of the product was confirmed by infrared spectroscopic analysis and elementary analysis. The

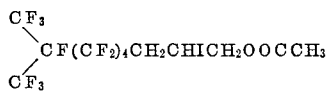

thus obtained was reacted with $CH_2=CH(CH_2)_4COOK$ in the manner of Example 4–(1), whereby

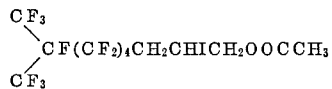

was obtained.

(2) Polymer.—(2–a) Homopolymer

A 10 weight percent solution of

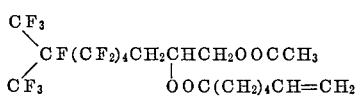

in $C_2F_3Cl_3$ was placed in a glass ampoule and the ampoule sealed up. The solution was irradiated by γ-rays of $Co^{60}$ in the manner as Example 2–(3), whereby a transparent polymer solution was obtained. A part of the solution was heated to evaporate the solvent, $C_2F_3Cl_3$, yielding a resin-like solid softening at about 40° C.

The polymer was confirmed to be a homopolymer of

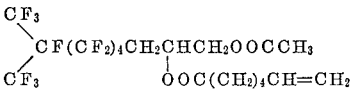

by infrared spectroscopic analysis and elementary analysis.

Said polymer solution was diluted with $C_2F_3Cl_3$ to a polymer concentration of 1 g./100 ml. A filter paper and craft paper was immersed in such diluted solution, taken out, and dried in air. The samples thus treated exhibited excellent water- and oil-repellency, sustaining drops of water, white mineral oil and machine oil without any infiltration.

(2–b) Copolymer with

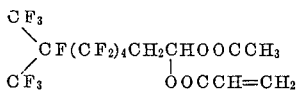

13 grams of the

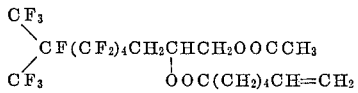

prepared in this example, 12 grams of the

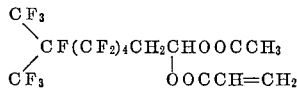

prepared in Example 2–(2), 200 grams of deoxidated distilled water and 7 grams of polyoxyethylene (octylphenyl) ether (H.L.B. 17.5) were placed in a 500 milliliter 4-necked flask equipped with a reflux condenser, thermometer, dropping funnel, nitrogen gas injector and stirrer. A solution of 1 gram of ammonium persulfate in 10 grams of deoxidated distilled water was added to the mixture with stirring in nitrogen stream at 60° C. After the completion of addition the system was maintained with stirring at 60°~65° C. for 3 hours, whereby a white polymer emulsion having a polymer concentration of 10.2 weight percent was obtained.

Methanol was added to a part of the emulsion and shaken to coagulate a light brown resin-like solid. The solid was washed with a hot water-methanol mixture and dried in a drier under reduced pressure until the weight of the solid indicated a constant value. The solid was confirmed to be a copolymer of

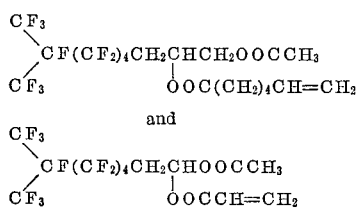

by infrared spectroscopic analysis and elementary analysis.

Said polymer emulsion was diluted with water to a polymer concentration of 1 weight percent. A cotton gabardine and wool-nylon worsted and cotton-nylon broad were immersed in such diluted emulsion, lightly squeezed, dried in air, heated at 130° C. for 6 minutes to cure the polymer attached thereon and washed with a 0.1 weight percent aqueous solution of a neutral detergent and then washed with water. The samples thus treated were further immersed in a dispersion prepared by dispersing 6 grams of "Norane R" (trademark for water-repellency of Warwick Chemical Co., U.S.A.), 1 gram of "Sumitex Resin M–3" (trademark for aqueous emulsion of melamine precondensate of Sumitomo Chemical Co., Ltd., Japan), 0.1 gram of "Sumitex ACX" (trademark for curing agent of Sumitomo Chemical Co., Ltd., Japan) and 1.2 grams of sodium acetate in 92 grams of water, then lightly squeezed, dried in air, cured at 130° C. for 5 minutes, washed with a 0.1 weight percent aqueous solution of a neutral detergent and washed with water and then finally dried in air.

The samples thus treated exhibited no changes in appearance, but exhibited excellent water- and oil-repellency, indicating 100 marks by AATCC Spray Test 22–1952 and sustaining drops of n-decane, tetrachloroethylene, kerosene oil, and whisky without any infiltration. The water- and oil-repellency did not decrease after 5 repeated soapings and dry-cleanings with a neutral detergent.

EXAMPLE 6

(This example illustrates the production of $$\begin{matrix} CF_3 \\ \phantom{C}\diagdown \\ \phantom{CF}CF(CF_2)_4CH_2CHCH_2OOCCH=CH_2 \\ \phantom{C}\diagup \phantom{CCCCCCCCCCCCC} | \\ CF_3 \phantom{CCCCCCCCC} OOCC_3H_7 \end{matrix}$$

and the polymer thereof)

(1)
$$\begin{matrix} CF_3 \\ \phantom{C}\diagdown \\ \phantom{CF}CF(CF_2)_4CH_2CHCH_2OOCCH=CH_2 \\ \phantom{C}\diagup \phantom{CCCCCCCCCCCCC} | \\ CF_3 \phantom{CCCCCCCCC} OOCC_3H_7 \end{matrix}$$

350 grams of $$\begin{matrix} CF_3 \\ \phantom{C}\diagdown \\ \phantom{CF}CF(CF_2)_4CH_2CHCH_2OH \\ \phantom{C}\diagup \\ CF_3 \end{matrix}$$

and 0.3 gram of hydroquinone were placed in a 500 milliliter 4-necked flask equipped with a reflux condenser connected to a hydrogenchloride-accepting trap, thermometer, dropping funnel, nitrogen gas injector and stirrer. 86.2 grams of $CH_2=CHCOCl$ was added dropwise to the mixture with stirring in nitrogen stream at 50° C.

The stirring was continued between 75° C. and 85° C. until generation of hydrogenchloride was terminated. The resultant mixture was rectified under reduced pressure, yielding 350 grams of a distillate 105°–108° C./0.20–0.21 mm. Hg. The distillate was confirmed to be single component by programmed temperature gas chromatographic analysis. Infrared spectroscopic analysis showed absorption due to $-CH_2-$ at $3.45\mu$, $$-\underset{\underset{O}{\|}}{C}-O-$$

at $5.88\mu$, $CH_2=CH-$ at $6.15\mu$, $$\begin{matrix} CF_3 \\ \phantom{C}\diagdown \\ \phantom{CF}CFCF_2CF_2- \\ \phantom{C}\diagup \\ CF_3 \end{matrix}$$

at $7.85\mu$, $8.0\mu$ and $10.2\mu$, and comparing with the absorption of the starting haloalcohol $$\left(\begin{matrix} CF_3 \\ \phantom{C}\diagdown \\ \phantom{CF}CF(CF_2)_4CH_2CHCH_2OH \\ \phantom{C}\diagup \\ CF_3 \end{matrix}\right)$$

no absorption due to $-OH$ was found which should have been found at or near $3.5\mu$.

Elementary analysis (percent): C, 26.0; F, 46.6; H, 1.3; O, 5.0; I, 21.1.—Calcd. for ($C_{13}F_{15}H_8O_2I$) (percent): C, 25.7; F, 46.9; H, 1.3; O, 5.2; I, 20.9. Found (percent): C, 26.0; F, 46.6; H, 1.3; O, 5.0; I, 21.1.

Thus the substance was confirmed to be $$\begin{matrix} CF_3 \\ \phantom{C}\diagdown \\ \phantom{CF}CF(CF_2)_4CH_2CHCH_2OOCCH=CH_2 \\ \phantom{C}\diagup \\ CF_3 \end{matrix}$$

150 grams of the $$\begin{matrix} CF_3 \\ \phantom{C}\diagdown \\ \phantom{CF}CF(CF_2)_4CH_2CHCH_2OOCCH=CH_2 \\ \phantom{C}\diagup \\ CF_3 \end{matrix}$$

56.5 grams of $C_3H_7COOK$, 371 grams of isoamylalcohol, 172 grams of $H(CF_2)_4CH_2OH$ and 0.2 gram of hydroquinone were placed in a 1-liter 4-necked flask equipped with a reflux condenser, thermometer and stirrer and the mixture heated with stirring at 100° to 105° C. for 5 hours. 350 grams of a mixture of $H(CF_2)_4CH_2OH$ and isoamyl alcohol was recovered by rectification under a reduced pressure of 1–5 mm. Hg and the residue was poured into a cold water. The oil-layer was separated and the water-layer was treated with $C_2F_3Cl_3$. The $C_2F_3Cl_3$ extract was combined with said oil-layer. The combined extract was dried with anhydrous sodium sulfate and rectified under reduced pressure, yielding 91 grams of distillate of 102°–108° C./0.08–0.12 mm. Hg. The distillate was confirmed to be a single component by programmed temperature gas chromatographic analysis.

Infrared spectroscopic analysis showed the same absorption as that of the starting haloester $$\left(\begin{matrix} CF_3 \\ \phantom{C}\diagdown \\ \phantom{CF}CF(CF_2)_4CH_2CHICH_2OOCCH=CH_2 \\ \phantom{C}\diagup \\ CF_3 \end{matrix}\right)$$

except new absorption due to $$-\underset{\underset{O}{\|}}{C}-O-$$

at $5.7\mu$ was found.

Elementary analysis.—Calcd. for ($C_{17}F_{15}H_{15}O_4$) (percent): C, 36.0; F, 50.2; H, 2.6; O, 11.2. Found (percent): C, 36.7; F, 50.0; H, 2.5; O, 10.8.

Thus the substance thus obtained was confirmed to be $$\begin{matrix} CF_3 \\ \phantom{C}\diagdown \\ \phantom{CF}CF(CF_2)_4CH_2CHCH_2OOCCH=CH_2 \\ \phantom{C}\diagup \phantom{CCCCCCCCCCCCC} | \\ CF_3 \phantom{CCCCCCCCC} OOCC_3H_7 \end{matrix}$$

(2) Polymer.—(2–a) Homopolymer 25 grams $$\begin{matrix} CF_3 \\ \phantom{C}\diagdown \\ \phantom{CF}CF(CF_2)_4CH_2CHCH_2OOCCH=CH_2 \\ \phantom{C}\diagup \phantom{CCCCCCCCCCCCC} | \\ CF_3 \phantom{CCCCCCCCC} OOCC_3H_7 \end{matrix}$$

200 grams of deoxidated distilled water, 7 grams of polyoxyethylene (octylphenyl) ether (H.L.B. 17.5) were placed in a 500 milliliter 4-necked flask equipped with a reflux condenser thermometer, dropping funnel, nitrogen gas injector and stirrer. A solution of 1 gram of ammonium persulfate in 10 grams of deoxidated distilled water was added to the mixture with stirring in nitrogen stream at 60° C. The stirring was continued for 3 hours at such temperature, whereby a stable polymer emulsion having a polymer concentration of 10 weight percent was obtained. Methanol was added to a part of the emulsion to coagulate the polymer. The polymer obtained was confirmed to be a homopolymer of said monomer by infrared spectroscopic analysis and elementary analysis.

Said polymer emulsion was diluted with water to a polymer concentration of 1 weight percent. A cotton poplin and wool jersey were immersed therein, lightly squeezed and dried in air, then heated at 130° C. for 5 minutes. The samples thus treated exhibited no changes in color and touch, but exhibited excellent water- and oil-repellency, sustaining drops of water, whisky, n-decane and tetrachloroethylene without any infiltration.

(2–b) Copolymer with $CH_2=CHCOOC_7H_{15}$ 20 grams of $$\begin{matrix}CF_3\\ \diagdown\\ \diagup\\ CF_3\end{matrix}CF(CF_2)_4CH_2CHCH_2OOCCH=CH_2\\ \quad\quad\quad\quad\quad\quad\quad |\\ \quad\quad\quad\quad\quad\quad\quad OOCC_3H_7$$

5 grams of $CH_2=CHCOOC_7H_{15}$, 200 milliliters of deoxidated distilled water and 7 grams of $C_7F_{15}COONH_4$ were placed in a 500 milliliter 4-necked flask equipped with a reflux condenser, thermometer, dropping funnel, nitrogen gas injector and stirrer. A solution of 1 gram of ammonium persulfate in 10 grams of deoxidated distilled water was added to the mixture at 60° C. The stirring was continued at such temperature for 4 hours, whereby a white stable polymer emulsion having polymer concentration of 9.8 weight percent was obtained.

Methanol was added to a part of the emulsion and violently stirred to coagulate the slightly elastic polymer, after which the polymer was washed with methanol. The polymer was confirmed to be a copolymer of $$\begin{matrix}CF_3\\ \diagdown\\ \diagup\\ CF_3\end{matrix}CF(CF_2)_4CH_2CHCH_2OOCCH=CH_2\\ \quad\quad\quad\quad\quad\quad\quad |\\ \quad\quad\quad\quad\quad\quad\quad OOCC_3H_7$$

and $CH_2=CHCOOC_7H_{15}$ by infrared spectroscopic analysis and elementary analysis. No unreacted $$CH_2=CHCOOC_7H_{15}$$

was found in the polymer emulsion, so that whole amount of the $CH_2=CHCOOC_7H_{15}$ employed was consumed in said copolymerization.

Said polymer emulsion was diluted with water to polymer concentration of 1 weight percent. A nylon cloth was immersed therein, lightly squeezed, dried in air, heated at 150° C. for 3 minutes, washed with a 0.5 weight percent aqueous solution of a neutral detergent at 50° C. for 20 seconds, washed with water and finally dried in air.

The nylon cloth thus treated exhibited excellent water- and oil-repellency, sustaining drops of water, n-decane, whisky and machine oil without any infiltration.

EXAMPLE 7

(This example illustrates the production of the starting compound, $F(CF_2)_8CH_2CHBr(CH_2)_2OH$, the present monomer, $$F(CF_2)_8CH_2CH(CH_2)_2OOCC(CH_3)=CH_2\\ \quad\quad\quad\quad |\\ \quad\quad\quad\quad OOCCH_3$$

and the polymer thereof)

(1) $F(CF_2)_8CH_2CHBr(CH_2)_2OH$ 280 grams (about 0.5 mole) of $F(CF_2)_8SO_2Br$, 45 grams (about 0.6 mole) of $CH_2=CH(CH_2)_2OH$ and 2 grams of azobisisobutyronitrile were placed in a 300 milliliter 4-necked flask equipped with a stirrer, reflux condenser and thermometer and the mixture was stirred under reflux temperature for 3 hours. Thereafter, a dispersion of 1 gram of azobisisobutyronitrile in 30 grams of $CH_2=CH(CH_2)_2OH$ was further added to the mixture and the system was stirred under reflux temperature for 8 hours. The resultant mixture was fractionally distilled in vacuo, yielding 78 grams of a distillate boiling at 83°–88° C./0.8–1.0 mm. Hg.

Analysis gave the following values:
Found (percent): C, 25.0; F, 56.0; Br, 14.2; H, 1.2; O, 2.6. Calcd. for ($C_{12}F_{17}H_8BrO$) (percent): C, 25.2; F, 56.2; Br, 14.0; H, 1.4; O, 2.8.

Infrared absorption spectra showed the presence of —OH, —$CH_2$— and $F(CF_2)_8$— groups.

Thus the substance was confirmed to be:

$$F(CF_2)_8CH_2CHBr(CH_2)_2OH$$

(2) $$F(CF_2)_8CH_2CH(CH_2)_2OOCC(CH_3)=CH_2\\ \quad\quad\quad\quad |\\ \quad\quad\quad\quad OOCCH_3$$

300 grams of $F(CF_2)_8CH_2CHBr(CH_2)_2OH$ and 0.3 gram of hydroquinone was placed in the same flask as Example 6–(1) and the mixture was heated with stirring at 50° C. Then 81.5 grams of $$CH_2=C-COCl\\ \quad\quad |\\ \quad\quad CH_3$$

was added dropwise and the stirring was continued at 75°–85° C. until generation of hydrogenchloride was terminated. The resultant mixture was rectified under reduced pressure, yielding 331 grams of a distillate of 103°–107° C./0.07–0.08 mm. Hg.

The distillate was confirmed to be a single component by programmed temperature gas chromatographic analysis, and to be $F(CF_2)_8CH_2CHBr(CH_2)_2OOCC(CH_3)=CH_2$ by infrared spectroscopic analysis and elementary analysis.

200 grams of the $$F(CF_2)_8CH_2CHBr(CH_2)_2OOCC(CH_3)=CH_2$$

61.6 grams of potassium acetate, 730 grams of $$H(CF_2)_4CH_2OH$$

and 0.5 gram of hydroquinone were placed in a 1 liter flask and the mixture was heated with stirring at 110° ~ 115° C. for 5 hours. The resultant mixture was distilled under reduced pressure to recover $H(CF_2)_4CH_2OH$, and the residue was poured into cold water. The oil-layer was separated and the water-layer was treated with $C_2Cl_3F_3$. The $C_2Cl_3F_3$ extract was combined with said oil-layer. The combined extract was dried with anhydrous sodium sulfate and rectified under reduced pressure, yielding 136 grams of a distillate of 105° ~ 108° C./ 0.10 ~ 0.13 mm. Hg. The distillate was confirmed to be $$F(CF_2)_8CH_2CH(CH_2)_2OOCC(CH_3)=CH_2\\ \quad\quad\quad\quad |\\ \quad\quad\quad\quad OOCCH_3$$

by infrared spectroscopic analysis and elementary analysis.

(3) Homopolymer 25 grams of $$F(CF_2)_8CH_2CH(CH_2)_2OOCC(CH_3)=CH_2\\ \quad\quad\quad\quad |\\ \quad\quad\quad\quad OOCCH_3$$

200 grams of deoxidated distilled water and 7 grams of polyoxyethylene (nonyl-phenyl) ether (H.L.B. 16.8) were placed in the same flask as Example 6(2–a) and the mixture was stirred in nitrogen stream at 60° C. Then a solution of 1 gram of potassium persulfate in 10 grams of deoxidated distilled water was added with stirring to the mixture and the stirring was continued at 70° ~ 75° C. for 5 hours, whereby a white milky polymer emulsion was obtained.

Methanol was added to a part of the emulsion to coagulate the white polymer soluble in $C_2F_3Cl_3$ and a mixture of acetone and $C_2F_3Cl_3$. The polymer was confirmed to be a homopolymer of $$F(CF_2)_8CH_2CH(CH_2)_2OOCC(CH_3)=CH_2\\ \quad\quad\quad\quad |\\ \quad\quad\quad\quad OOCCH_3$$

by infrared spectroscopic analysis and elementary analysis.

EXAMPLE 8

(This example illustrates the production of $$\begin{matrix}CF_3\\ \diagdown\\ \diagup\\ CF_3\end{matrix}CF(CF_2)_4CH_2CH(CH_2)_8OOCCH_2CH=CH_2\\ \quad\quad\quad\quad\quad\quad\quad\quad |\\ \quad\quad\quad\quad\quad\quad\quad\quad OOCC_7H_{15}$$

and the polymer thereof)

(1) $$\begin{matrix}CF_3\\ \diagdown\\ \diagup\\ CF_3\end{matrix}CF(CF_2)_4CH_2CH(CH_2)_8OOCCH_2CH=CH_2\\ \quad\quad\quad\quad\quad\quad\quad\quad |\\ \quad\quad\quad\quad\quad\quad\quad\quad OOCC_7H_{15}$$

$$\begin{matrix}CF_3\\ \diagdown\\ \diagup\\ CF_3\end{matrix}CF(CF_2)_4I \text{ and } CH_2=CH(CH_2)_8OH$$

was reacted for 12 hours in manner as Example 1–(1), whereby $$\begin{array}{c}CF_3\\ \phantom{CF_3}\diagdown\\ \phantom{CF_3CF}CF(CF_2)_4CH_2CHI(CH_2)_8OH\\ \phantom{CF_3}\diagup\\ CF_3\end{array}$$

was obtained.

300 grams of $$\begin{array}{c}CF_3\\ \phantom{CF_3}\diagdown\\ \phantom{CF_3CF}CF(CF_2)_4CH_2CHI(CH_2)_8OH\\ \phantom{CF_3}\diagup\\ CF_3\end{array}$$

were reacted with 67.2 grams of $CH=CHCH_2COCl$ in the presence of 0.3 gram of hydroquinone under the same conditions as Example 6–(1). The resultant mixture was dissolved in methanol to which water was added for reprecipitation, from which 283 grams of $$\begin{array}{c}CF_3\\ \phantom{CF_3}\diagdown\\ \phantom{CF_3CF}CF(CF_2)_4CH_2CHI(CH_2)_8OOCCH_2CH=CH_2\\ \phantom{CF_3}\diagup\\ CF_3\end{array}$$

were obtained.

150 grams of the resultant compound, 95 grams of $C_7H_{15}COOK$, 532 grams of $H(C_2F_4)_2CH_2OH$, and 0.5 gram of hydroquinone were placed in a 1 liter 4-necked flask, and were reacted with thorough stirring at 115° ~ 120° C. for 7 hours. The resultant product was heated under a reduced pressure to distill most part of $$H(C_2F_4)_2CH_2OH$$

after which the residue was dissolved in 500 grams of $C_2F_3Cl_3$ and washed with water, and heated under a reduced pressure to thoroughly distill out $C_2F_3Cl_3$ and remaining $H(C_2F_4)_2CH_2OH$.

The resultant residue was dissolved in methanol to which water was added to reprecipitate the product. Thus 77.4 grams of $$\begin{array}{c}CF_3\\ \phantom{CF_3}\diagdown\\ \phantom{CF_3CF}CF(CF_2)_4CH_2CH(CH_2)_8OOCCH_2CH=CH_2\\ \phantom{CF_3}\diagup\phantom{CF(CF_2)_4CH_2CH}|\\ CF_3\phantom{CF(CF_2)_4CH_2CH}OOCC_7H_{15}\end{array}$$

were obtained.

The identification of the above product was confirmed by infrared spectroscopic analysis, and elementary analysis.

(2) Copolymer with $F(CF_2)_9CH_2CH_2OOCCH=CH_2$ 10 grams of $$\begin{array}{c}CF_3\\ \phantom{CF_3}\diagdown\\ \phantom{CF_3CF}CF(CF_2)_4CH_2CH(CH_2)_8OOCCH_2CH=CH_2\\ \phantom{CF_3}\diagup\phantom{CF(CF_2)_4CH_2CH}|\\ CF_3\phantom{CF(CF_2)_4CH_2CH}OOCC_7H_{15}\end{array}$$

10 grams of $F(CF_2)_9CH_2CH_2O_2CCH=CH_2$, 180 grams of deoxidated distilled water, 5 grams of $C_7F_{15}COONH_4$ and 10 grams of acetone were placed in a 500 milliliter 4-necked flask, and with stirring in nitrogen stream at 60° C., 0.8 gram of ammonium persulfate dissolved in 10 grams of deoxidated distilled water was added thereto.

After 4 hours of the above polymerization at 60° ~ 65° C. a light yellow emulsion was obtained, which was stable. Methanol was added to such emulsion with shaking and the solids were precipitated and the emulsion turned transparent. 8.6 weight percent of the solids were contained in said emulsion, which by infrared spectroscopic analysis and elementary analysis were confirmed to be a copolymer of $$\begin{array}{c}CF_3\\ \phantom{CF_3}\diagdown\\ \phantom{CF_3CF}CF(CF_2)_4CH_2CH(CH_2)_8OOCCH_2CH=CH_2\\ \phantom{CF_3}\diagup\phantom{CF(CF_2)_4CH_2CH}|\\ CF_3\phantom{CF(CF_2)_4CH_2CH}OOCC_7H_{15}\end{array}$$

and $F(CF_2)_9CH_2CH_2OOCCH=CH_2$.

The solid polymer thus obtained was dissolved in $C_2F_3Cl_3$, to which hot water was slowly added to vaporize $C_2F_3Cl_3$ and the polymer was separated again, after which redissolved in $C_2F_3Cl_3$ to a 10 weight percent concentration. 10 grams of the resultant solution were placed in a pressure bottle into which a mixed liquified gas of $CF_2Cl_2$ and $CFCl_3$ at a volume ratio of 50:50 was injected to make a total volume of 100 milliliters of self-pressurized sprayable product, aerosol. The aerosol was applied by spraying to the inner surface of ice-cube tray of a refrigerator, and dried in the air. Ice-cubes were easily separable from the thus treated tray. Application of the aerosol to shirt sleeves and collar proved to reduce soiling and to afford easy washing of soil.

EXAMPLE 9

(This example illustrates the production of $$\begin{array}{c}CF_3\\ \phantom{CF_3}\diagdown\\ \phantom{CF_3CF}CF(CF_2)_4CH_2CHCH_2OOCCH=CH_2\\ \phantom{CF_3}\diagup\phantom{CF(CF_2)_4CH_2CH}|\\ CF_3\phantom{CF(CF_2)_4CH_2CH}OOCC_7H_{15}\end{array}$$

and the polymer thereof)

(1)
$$\begin{array}{c}CF_3\\ \phantom{CF_3}\diagdown\\ \phantom{CF_3CF}CF(CF_2)_4CH_2CHCH_2OOCCH=CH_2\\ \phantom{CF_3}\diagup\phantom{CF(CF_2)_4CH_2CH}|\\ CF_3\phantom{CF(CF_2)_4CH_2CH}OOCC_7H_{15}\end{array}$$

520 grams of $$\begin{array}{c}CF_3\\ \phantom{CF_3}\diagdown\\ \phantom{CF_3CF}CF(CF_2)_4CH_2CHICH_2OH\\ \phantom{CF_3}\diagup\\ CF_3\end{array}$$

210 grams of potassium acrylate ($CH_2=CHCOOK$), 650 grams of $H(CF_2)_4CH_2OH$, 935 grams of allylalcohol and 5 grams of hydroquinone were placed in a 3-liter 4-necked flask equipped with a reflux condenser, thermometer and agitator, and the mixture was maintained with thorough stirring under reflux temperature for 6 hours after which it was cooled to room temperature and filtrated to remove solid materials contained therein. Then allylalcohol was recovered by distillation and the residue was dissolved in trifluorotrichloroethane ($C_2F_3Cl_3$). The solution was filtered to remove insoluble solid materials and washed with water and dried with anhydrous sodium sulfate.

By rectification thereof, the compound, 390 grams of $$\begin{array}{c}CF_3\\ \phantom{CF_3}\diagdown\\ \phantom{CF_3CF}CF(CF_2)_4CH_2CHCH_2OOCCH=CH_2\\ \phantom{CF_3}\diagup\phantom{CF(CF_2)_4CH_2CH}|\\ CF_3\phantom{CF(CF_2)_4CH_2CH}OH\end{array}$$

was obtained as a distillate of 102° ~103° C./2.5 mm.Hg.

The identification of the compound was confirmed by gas chromatographic analysis, infrared spectroscopic analysis and elementary analysis.

100 grams of $$\begin{array}{c}CF_3\\ \phantom{CF_3}\diagdown\\ \phantom{CF_3CF}CF(CF_2)_4CH_2CHCH_2OOCCH=CH_2\\ \phantom{CF_3}\diagup\phantom{CF(CF_2)_4CH_2CH}|\\ CF_3\phantom{CF(CF_2)_4CH_2CH}OH\end{array}$$

38 grams of caprylic chloride, 0.3 gram of hydroquinone and 0.5 gram of copper powder were placed in a 200 milliliter 4-necked flask with agitator, reflux condenser, thermometer and alkali solution trap connected to the outlet of the reflux condenser, and the mixture was heated at 75°~85° C. for 8 hours. Hydrogen chloride gas generated thereby was forced to be absorbed by alkali solution trap. The reacted product was rectified in vacuo to produce 55 grams of a distillate of 128°~132° C./0.02 mm.Hg. Said distillate was confirmed by programmed temperature gas chromatographic analysis to consist substantially of a single component, and by infrared spectroscopic analysis showing absorptions at 3.45μ due to $$—CH_2—$$

at 5.75μ and 5.85μ due to $$\begin{array}{c}—C—O—\\ \|\\ O\end{array}$$

at 6.15μ due to $CH_2=CH-$, and at 7.85μ, 8.0μ and 10.2μ due to

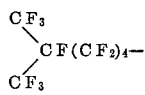

respectively while the absorption at or near 3.05μ due to —OH which was observed in the starting hydroxy ester was not found. Further by elementary analysis gave:

Calcd. for $C_{21}F_{15}H_{23}O_4$ (percent): C, 40.4; H, 3.7; F, 45.6; O, 10.3. Found (percent): C, 39.8; H, 3.9; F, 44.5; O, 11.8.

Thus the distillate was confirmed to be

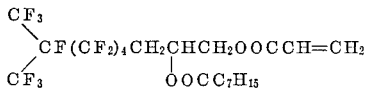

(2) Homopolymer 15 grams of

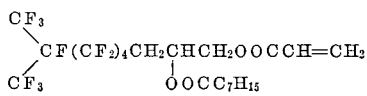

100 grams of deoxidated distilled water, and 5 grams of polyoxyethylene (octylphenyl) ether (H.L.B. 18.2) were placed in a 200 milliliter 4-necked flask with agitator, reflux condenser dropping funnel, thermometer and nitrogen gas injector, and the mixture was stirred in nitrogen stream at 55°~60° C. for 30 minutes after which 1 gram of ammonium persulfate dissolved in 30 grams of deoxidated distilled water was added dropwise, and stirred at 60°~65° C. for 3 hours whereby a polymer emulsion, milky white in color was produced. Polymer concentration of said emulsion was 9.5 weight percent. A part of the emulsion was shaken in methanol, and a white resin-like solids were coagulated, which after washing with water and washing with methanol were dried to the constant weight. Absorptions of infrared spectroscopic analysis resembled said monomer, except that the absorption due to $CH_2=CH-$ at 6.15μ of the latter was not observed.

By elementary analysis gave:

Found (percent): C, 40.2; H, 3.7; F, 44.2; O, 11.9.

Thus said polymer was confirmed to be a homopolymer of

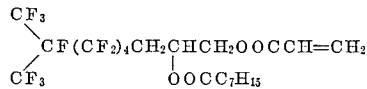

Another part of the emulsion was diluted with water to 1 weight percent polymer concentration, in which sample cuttings of cotton poplin, woolen jersey and nylon umbrella cloth were dipped, then lightly squeezed, dried in the air and heated at 130° C. for 4 minutes. Then the samples were soaped with a 0.5 weight percent aqueous solution of neutral detergent at 50° C. for 20 seconds, then washed with water and thoroughly dried. The sample cuttings thus treated exhibited excellent water-repellency and oil-repellency, namely, the cotton poplin sustained without infiltration drops of water, soy, and whisky, and after wiping off with blotting paper, there remained no trace of such liquids, also sustained without infiltration drops of n-dodecane, tetrachloroethylene and kerosene oil. The woolen jersey and nylon cuttings sustained for a long time without infiltration drops of water, whisky, ink, n-decane, n-octane and tetrachloroethylene.

EXAMPLE 10

(This example illustrates the production of

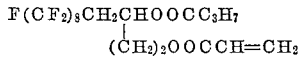

and the homopolymer thereof)

(1) 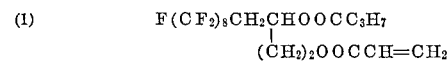

$F(CF_2)_8CH_2CHI(CH_2)_2OH$ and $CH_2=CHOOK$ were reacted in the manner as Example 9-(1), whereby

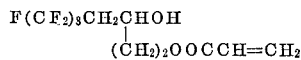

was obtained.

60 grams of

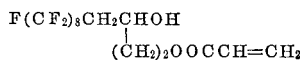

0.1 gram of copper powder and 0.1 gram of hydroquinone were placed in a 100 milliliter 4-necked flask equipped with a reflux condenser connected to a hydrogenchloride-accepting trap, thermometer, dropping funnel, nitrogen gas injector and stirrer and the mixture was stirred in nitrogen stream at 50° C. 20 grams of $C_3H_7COCl$ was added dropwise to the mixture and the stirring was continued at 75° to 85° C. until generation of hydrogenchloride was terminated. The resultant mixture was rectified under reduced pressure whereby unreacted $C_3H_7COCl$ was recovered and 48 grams of a distillate of 124°~129° C./0.07~0.12 mm. Hg was obtained. The distillate was confirmed to be a single component by programmed temperature gas chromatographic analysis and to be

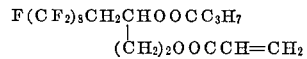

infrared spectroscopic analysis and elementary analysis.

(2) Homopolymer

The product,

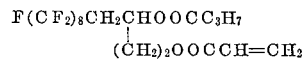

thus obtained was polymerized by emulsion polymerization under the manner as Example 9-(2), whereby a polymer emulsion having polymer concentration of 9.2 weight percent was obtained. The identification of the polymer was confirmed by infrared spectroscopic analysis and elementary analysis.

The emulsion was diluted with water to polymer concentration of 1 weight percent, and a cotton gabardine and a cotton-nylon broad cloth were treated with such diluted emulsion in the manner as Example 5(2-b).

The samples thus treated exhibited excellent water- and oil-repellency, sustaining drops of water, whisky, ink, n-decane, tetrachloroethylene, machine oil and kerosene oil without any infiltration.

EXAMPLE 11

This example illustrates the production of copolymer

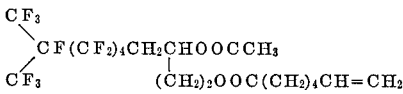

and

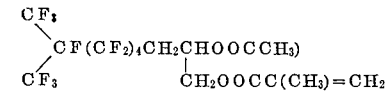

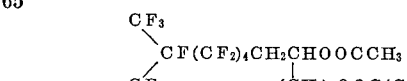

was prepared by reacting

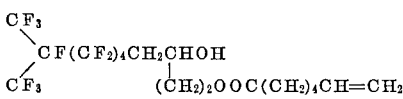

with

CH₃COCl in the manner as Examples 9–(1), and

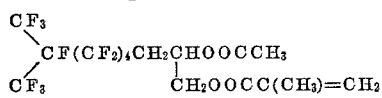

was prepared by reacting

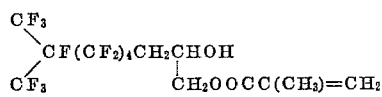

with

CH₃COCl in the manner as in Example 9–(1).

A solution of 5 grams of

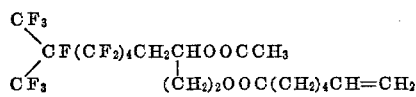

and 5 grams of

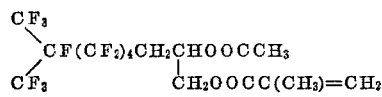

was placed in a glass ampoule and γ-rays were irradiated under same conditions as Example 2–(2), whereby a polymer solution having polymer concentration of 10 weight percent was obtained. The polymer thus obtained was confirmed to be a copolymer of said monomers employed by infrared spectroscopic analysis and elementary analysis.

10 grams of said polymer solution were placed in a pressure bottle, and a 1:1 volume ratio liquified gas mixture of $CFCl_3$ and $CF_2Cl_2$ was injected in the bottle to prepare self-pressurized sprayable product "aerosol." The aerosol was very stable and exhibited no change for 3 months.

The aerosol was sprayed to a fibre board made of fibre flocks and asbestos and dried at room temperature. The fibre board thus treated sustained drops of mud water, ink, whisky and kerosene oil without any infiltration, and no trace remained on the board when the drops was wiped off by a blotting paper.

What is claimed is:

1. A polymer exhibiting water and oil repellant properties having a skeletal chain containing ester units represented by the formula:

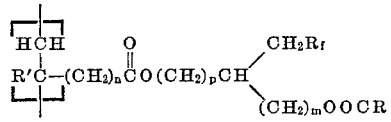

wherein $R_f$ is a perfluoroalkyl group having 3 to 21 carbon atoms, R is an alkyl group having 1 to 18 carbon atoms, R' is one member of the group consisting of hydrogen atom and methyl group, m is an integer of from 0 to 10, p is an integer of from 0 to 10 when m is 0 and p is 0 when m is 1 to 10, and n is an integer of from 0 to 10.

2. A homopolymer of a fluorocarbon compound having the formula:

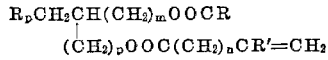

wherein $R_f$ is a perfluoroalkyl group having 3–21 carbon atoms, R is an alkyl group having 1 to 18 carbon atoms, R' is one member of the group consisting of hydrogen and methyl, m is an integer of from 0 to 10, p is an integer of from 0 to 10, when m is 0, and p is 0, when m is 1–10, and n is an integer of from 0 to 10.

3. A copolymer of the fluorocarbon compound specified in claim 2 and a copolymerizable material which contains an ethylenic linkage exhibiting water and oil repellant properties.

4. An aqueous emulsion suitable for rendering a solid material water-repellent and oil-repellent, containing the polymer specified in claim 1.

5. An organic solvent solution suitable for rendering a solid material water-repellent and oil-repellent, containing the polymer specified in claim 1.

6. An article coated with the polymer specified in claim 1.

7. An article coated with the polymer specified in claim 1 and a quaternary ammonium salt having a higher alkyl group of 12 to 20 carbon atoms.

References Cited

UNITED STATES PATENTS 3,409,602  11/1968  Anello _____ 260—89.5

JOSEPH L. SCHOFER, Primary Examiner

J. KIGHT, Assistant Examiner

U.S. Cl. X.R.

260—23, 29.1, 29.6, 78.5, 89.5; 117—124, 126, 140, 145, 148, 155, 161, 138.8